(12) United States Patent
Lv et al.

(10) Patent No.: US 8,523,456 B2
(45) Date of Patent: Sep. 3, 2013

(54) COLD JOINT TERMINAL FOR OPTICAL FIBERS

(75) Inventors: Genliang Lv, XuYi (CN); Jinan Huang, XuYi (CN)

(73) Assignee: Jiangsu Unikit Optical Technologies Co., Ltd., Jiangsu (CN)

( * ) Notice: Subject to any disclaimer, the term of this patent is extended or adjusted under 35 U.S.C. 154(b) by 126 days.

(21) Appl. No.: 13/320,515

(22) PCT Filed: May 24, 2010

(86) PCT No.: PCT/CN2010/073146
§ 371 (c)(1),
(2), (4) Date: Nov. 14, 2011

(87) PCT Pub. No.: WO2010/139243
PCT Pub. Date: Dec. 9, 2010

(65) Prior Publication Data
US 2012/0063722 A1    Mar. 15, 2012

(30) Foreign Application Priority Data
Jun. 4, 2009 (CN) .......................... 2009 1 0032845

(51) Int. Cl.
G02B 6/00 (2006.01)
G02B 6/36 (2006.01)
G02B 6/255 (2006.01)
G02B 6/38 (2006.01)

(52) U.S. Cl.
USPC ............................................ 385/62; 385/88

(58) Field of Classification Search
USPC ................ 385/60–65, 88–90, 139–144, 147, 385/53, 98, 81, 86, 58
See application file for complete search history.

(56) References Cited

U.S. PATENT DOCUMENTS

| | | | | |
|---|---|---|---|---|
| 5,682,450 A | * | 10/1997 | Patterson et al. | ............... 385/65 |
| 5,694,506 A | * | 12/1997 | Kobayashi et al. | ............. 385/60 |
| 5,708,746 A | * | 1/1998 | Kim et al. | ........................ 385/95 |

(Continued)

FOREIGN PATENT DOCUMENTS

| | | |
|---|---|---|
| CN | 1675573 A | 9/2005 |
| CN | 101006374 A | 7/2007 |

(Continued)

OTHER PUBLICATIONS

International Search Report, dated Sep. 2, 2010, corresponding to PCT/CN2010/073146, 4 pages.

*Primary Examiner* — Akm Enayet Ullah
(74) *Attorney, Agent, or Firm* — Christie, Parker & Hale, LLP (57) ABSTRACT

A cold joint terminal for optical fibers comprises a box-shaped casing (1), a fixing device, and a compressing device which are provided in the casing (1). The fixing device comprising a tail shaft (4), a pushing pipe (5), and a guiding block (7), is used for fixing the fiber jacket when the fibers are inserted in position. The compressing device comprising a V-shaped groove metal block (2) and a cap (3), is compressed when the end faces of two fibers contact with each other. Connecting chambers (1-6) are provided respectively at both ends of the casing (1). A floating block (1-2) is provided in the middle of the casing (1). A caulking groove (1-1) and a groove (1-5) for receiving the cap (3) are provided respectively on both sides of the floating block (1-2).

8 Claims, 7 Drawing Sheets

(56) References Cited

U.S. PATENT DOCUMENTS

| | | | |
|---|---|---|---|
| 5,734,770 A * | 3/1998 | Carpenter et al. | 385/72 |
| 5,761,360 A * | 6/1998 | Grois et al. | 385/81 |
| 7,140,787 B2 * | 11/2006 | Yamauchi et al. | 385/98 |
| 7,454,117 B2 * | 11/2008 | Carpenter et al. | 385/137 |
| 7,597,484 B2 * | 10/2009 | Ghahremani et al. | 385/76 |
| 7,637,673 B2 * | 12/2009 | Oike et al. | 385/98 |
| 7,658,553 B2 * | 2/2010 | Semmler et al. | 385/98 |
| 8,118,494 B2 * | 2/2012 | Larson et al. | 385/60 |
| 8,295,669 B2 * | 10/2012 | Park et al. | 385/135 |
| 2006/0072884 A1 | 4/2006 | Yamauchi et al. | |
| 2007/0217745 A1 | 9/2007 | Semmler et al. | |
| 2008/0304795 A1 | 12/2008 | Oike et al. | |

FOREIGN PATENT DOCUMENTS

| | | |
|---|---|---|
| CN | 201051163 Y | 4/2008 |
| CN | 101576638 A | 11/2009 |
| JP | 2004-37718 | 2/2004 |

\* cited by examiner

COLD JOINT TERMINAL FOR OPTICAL FIBERS

CROSS-REFERENCE TO RELATED APPLICATION(S)

This application is a National Phase Patent Application and claims the priority to and benefit of International Application Number PCT/CN2010/073146, filed on May 24, 2010, which claims priority of Chinese Patent Application Number 200910032845.8, filed on Jun. 4, 2009.

TECHNICAL FIELD

The present invention relates to a connection unit used for butt installation of optical fibers and particularly relates to a cold joint terminal for optical fibers.

BACKGROUND TECHNIQUE

Presently, cold joint terminals used for butting optical fibers are utilized with two different methods to fix the optical fibers.

In one method, the optical fibers are butted by compressing a folded sheet metal to fix the terminals of two optical fibers. Wherein, the folded sheet metal is arranged with a V-groove for butting the optical fibers; liquid substances are placed in drops at the joints of terminals to improve transmission of light; the devices are compressed by pushing the wedge-shape fixed block to reduce the gap of the folded sheet metal and thus the two fibers are compressed and butted; and the tail optical fiber is jam-packed only in the hole formed in the device.

The sheet metal with the above structure will become deformed both due to expansion and contraction along with temperature changes and due to aging along with time. This will make the distance between the end faces of the two impacted optical fibers increase, resulting in a seriously declining connection indicator.

In the other method, the optical fibers are butted by hitching folded plastic blocks to fix the ends of two optical fibers. Wherein, one of the folded plastic blocks is arranged with a V-groove for butting the optical fibers, and a compressing block that is higher than the outer flank of the housing body is arranged on the backside; liquid substances are placed in drops at the joint of terminals to improve transmission of light; the devices are compressed by pushing the compressing block on the backsides of the folded plastic blocks to reduce the gap of the folded plastic blocks, and thus the two optical fibers are compressed and butted; and the tail optical fiber is jam-packed only in the hole formed in the device.

The plastic block with the above structure has a lower degree of finish than that of the sheet metal and its surface is not smooth. The plastic parts may be scratched by the fiber cutting edge when the fiber is threaded, thus generating plastic scrap, which will pollute the butting fluid. This will also make the distance between the end faces of the two impacted optical fibers increase, resulting in a seriously declining connection indicator.

The two methods above require a special tool during the operation of butting the optical fiber. Two optical fibers stuffed according to a fixed-length and pre-defined specifications, are inserted into the special tool at both sides of the tool at the same time. Then the optical fiber connectors and optical fiber sheath are fixed by the addition of the special tool. The special tool is complicated, large, expensive, and inconvenient to carry.

DISCLOSURE OF THE INVENTION

Technical Problems

The present invention overcomes the problem in the existing technology by providing a cold joint terminal for optical fiber which can achieve a quick connection of optical fibers that are stuffed according to a fixed length and pre-defined specifications, without the use of any special tool and with a high success rate.

Technical Solution

The technical solution of the present invention is a cold joint terminal for optical fiber, including a box-shaped casing, which contains both a fixing device that is used for fixing the sheath after the optical fiber is inserted into place, and a compressing device for compressing the two optical fibers with joint end faces into the V-groove. Connection chambers will be arranged on both sides of the box-shaped case. The center of the box-shaped case will be arranged with a floating block having a caulking groove and a building slot on each side separately. The fixing device includes a caudal peduncle, an ejector sleeve, and a guide block. The guide block is internally equipped with a small positioning taper hole having a conical shape and a fiber hole. The caudal peduncle is pushed into the connection chambers on the two sides of the box-shaped casing and the guide block is pushed into the container on the caudal peduncle. The caudal peduncle is internally equipped with a big positioning taper hole and a compressing chamber. The caudal peduncle is equipped with at least one hanging block which is connected to the caudal peduncle by both a bar to be broken and a connecting bar. The ejector sleeve is attached to the caudal peduncle and it can push down the hanging block to rupture the bar to be broken. Then the ejector sleeve can further push the hanging block at one side to compress the scarfskin of the optical fiber and clamp the optical fiber into the side of pushed hanging block, making the space in the caudal peduncle smaller. In this way, the sheath of the optical fiber threading the space is fixed. The compressing device includes a V-groove metal block and a building cover. The V-groove metal block is embedded in the caulking groove of the box-type casing; the optical fiber through hole is formed between the V-groove and the floating block; the building cover is pushed into the caulking groove in the box-type casing; the floating block is pressed to compress the optical fiber connector into the V-groove metal block in the caulking groove; and the optical fiber holes of the guide block in the containers of the two caudal peduncles and the caudal peduncle compressing chamber should be on the same axis.

The box-shaped casing is arranged with a card slot on the surface. The building cover is equipped with a buckle. The buckle is clipped in the card slot, thus the box-shaped casing is clipped with the building cover. A positioning table is further arranged on both sides of the outside surface of the box-shaped casing and corresponds with the starting card slot and the ending card slot on the two sides of the building cover to control the location of the building cover.

The two sides of the V-groove in the V-groove metal block are arranged with guide faces.

The floating block and the box-type casing are connected by the floating bar. The floating block is also arranged with a guide slope and a guide fiber surface. The body of the building cover is arranged with a chamfer angle matching with the guide slope. The building cover pushes the floating block though the guide slope and thus the pressing of the two pairs of butted optical fibers is realized. The guide fiber face and the guide face of the V-shaped metal block form a complete optical fiber guide surface.

The big positioning taper hole and the small positioning taper hole are both of a conical surface.

The ejector sleeve is arranged with a lead-in conical surface.

For the cold joint terminal for optical fiber of the present invention, a wire jacket can be arranged in the caudal peduncle. Through the forcipation performed by the hanging block in the caudal peduncle, the wire jacket contracts to compress the minor sized optical fiber sheath.

The cold joint terminal for optical fiber of the present invention initially locates the penetration depth of the optical fiber by the big positioning taper hole and the small positioning taper hole. The optical fiber sheath undergoes forcipation by the hanging block and as a result, the two butting optical fibers are compressed through a box-building type floating block. One optical fiber which is stuffed according to a fixed length and pre-defined specifications, can be inserted from one side to the other side. The ejector sleeve is pushed where the optical fiber is inserted and the optical fiber sheath is compressed. Then another optical fiber which is stuffed according to a fixed length and pre-defined specifications, is inserted from the other side until the end faces of the two optical fibers hug closely. The ejector sleeve is pushed where the optical fiber is inserted and the optical fiber sheath is compressed. Finally, the building cover is compressed and the ends of the two optical fibers in the metal V-groove through the floating block are compressed to complete the connection work. The joint terminal has the advantages of having a reliable structure, convenience for connection without a specially required tool, a long service life, a high success rate, and a much lower cost.

Beneficial Effects

Compared to the prior art, the present invention has advantages as follows:

1. The cold joint terminal for optical fiber of the present invention compresses the optical fiber scarfskin to be connected in steps and then fixes the optical fiber connector. No special tool is required and it is of low cost, easy operation, and a high success rate.

2. The cold joint terminal for optical fiber of the present invention initially locates the penetration depth of the optical fiber by the big positioning taper hole and the small positioning taper hole, thus it is applicable to optical fibers with different sizes of sheath diameter.

3. The cold joint terminal for optical fiber of the present invention includes a caudal peduncle fixing device. First, the optical fiber is pushed, then the ejector sleeve is pushed in the caudal peduncle toward the same direction with that of the optical fiber. Forcipation by the hanging block of the caudal peduncle reduces the space in the caudal peduncle hole, and then the sheath of the optical fiber threading the space is fixed. As the sheath is fixed in the inserted direction of the optical fiber, the optical fiber always bears a jointing force to be pushed forward, which greatly improves the success rate of connection. Additionally, the naked fiber is fully protected from fracture during the complete process of connection.

4. In the cold joint terminal for optical fiber of the present invention, the hanging block is connected with the caudal peduncle on the radial side. Therefore, the optical fiber is threaded smoothly and the end faces of the optical fiber can be free of damage.

5. The cold joint terminal for optical fiber of the present invention adopts a V-groove metal block and a suspension type floating block. The V-groove is made of metal materials and the surface has a high degree of smoothness. Additionally, in the initial state, there is an open space between the V-groove and the floating block, which is beneficial to threading the optical fibers. The operation of threading the optical fiber will not generate plastic scrap, pollute the matching fluid, or affect the performance of connection.

6. In order to compress the two butted optical fibers of the present invention, the building cover is pressed into the building slot and then the floating block is pushed to compress the optical fibers in the V-groove. The compression force is great and reliable. The connection quality is not affected by the temperature variation, nor aging of materials, and therefore the cold joint terminal has a long operation life.

7. In the cold joint terminal for optical fiber of the present invention, the floating block is made of nonmetal materials with a high coefficient of friction and a low coefficient of thermal expansion. After compression, the influence of thermal expansion and contraction as well as other forms of deformation of the V-groove metal block on the quality of the optical fiber connection can be greatly reduced.

8. The present invention can also be placed in a casing, both sides of which can be connected with the optical fiber sheath. In this way, reliable butting of optical fiber can be truly realized.

DESCRIPTION OF THE DRAWINGS

FIGS. 2a and 2b are 3D schematic views of an embodiment of the cold joint terminal for optical fiber according to example 1 of the present invention. Wherein.

FIGS. 3a and 3b are 3D schematic diagrams of the box-shaped casing of the present invention. Wherein.

FIGS. 6a and 6b are 3D schematic diagrams of the structure of the caudal peduncle of the present invention. Wherein.

Wherein, the following numbers are represented as: 1. box-type casing, 2. V-groove metal block, 3. building cover, 4. caudal peduncle, 5. ejector sleeve, 6. wire jacket, 7. guide block, 1-1. caulking groove, 1-2. floating block, 1-3. guide slope, 1-4. floating bars, 1-5. building slot, 1-6. connection chamber, 1-7. card slot, 1-8. positioning table, 1-9. guide fiber face, 2-1. V-groove, 2-2. guide face, 2-3. optical fiber through hole, 3-1. building body, 3-2. buckle, 3-3. chamfer angle, 3-4.

starting card slot, 3-5. ending card slot, 4-1. the outer end of the caudal peduncle, 4-2. container, 4-3. big positioning taper hole, 4-4. hanging block, 4-5. guide taper hole, 4-6. ambulatory slot, 4-7. compressing chamber, 4-8. bar to be broken, 4-9. connecting bar, 5-1. ejector sleeve body, 5-2. lead-in taper surface; 6-1. threading hole, 6-2. lead-in taper hole, 7-1. small positioning taper hole, and 7-2. optical fiber hole.

DESCRIPTION OF THE EMBODIMENTS

The invention will be illustrated in combination with the attached drawings in the next part.

As shown in FIGS. 1 to 10, a cold joint terminal for optical fiber mainly is composed of a box-shaped casing (1), a fixing device for fixing the sheath after the optical fiber is inserted in place, and a compressing device for compressing the laminated end faces of the optical fiber into the V-groove.

Wherein, the fixing device includes: a caudal peduncle (4), an ejector sleeve (5), a wire jacket (6), and a guide block (7). The caudal peduncle (4) is compressed into connection chambers (1-5) at the two sides of box-type casing (1). The guide block (7) is compressed into the container (4-2) in the caudal peduncle (4). The wire jacket (6) can be placed into the compressing chamber (4-7) of the caudal peduncle (4). The ejector sleeve (5) is attached to the outside end (4-1) of the caudal peduncle (4). The caudal peduncle (4) can be arranged with a built-in big positioning taper hole (4-3) which has a conical surface, and the caudal peduncle (4) is arranged with at least one hanging block (4-4) which can be connected with the caudal peduncle by both a bar to be broken and a connecting bar. When the optical fiber is threaded, the two ends of the hanging block (4-4) are connected, which is beneficial to smooth optical fiber threading. When the ejector sleeve (5) is pushed upwards, the hanging block (4-4) is pushed down by the ejector sleeve (5). The bar to be broken at the front end fractures and the hanging block is pushed down to clamp the optical fiber. Then the internal space becomes smaller and the threaded optical fiber sheath is fixed.

The compressing device includes a V-groove metal block (2) and a building cover (3); wherein, the V-groove metal block (2) is embedded in the caulking groove (1-1) of the box-type casing (1); and the building cover (3) is pushed into the building slot (1-5) of the box-type casing. The floating block (1-2) is arranged between the caulking groove (1-1) and the building slot (1-5) of the box-type casing (1) to compress the optical fiber connector into the V-groove metal block (2) of the caulking groove (1-1). The connection chambers (1-6) are arranged on the two sides of the box-type casing to connect with the caudal peduncle (4).

The box-type casing (1) is arranged with the card slot (1-7) on the outside surface to be jointed with the building cover (3); the box-type casing (1) is arranged with the positioning tables (1-8) on both sides of the outer surface which match with the starting card slot (3-4) and the ending card slot (3-5) on the two sides of the building cover to control the location of building cover (3).

Figure 5A:
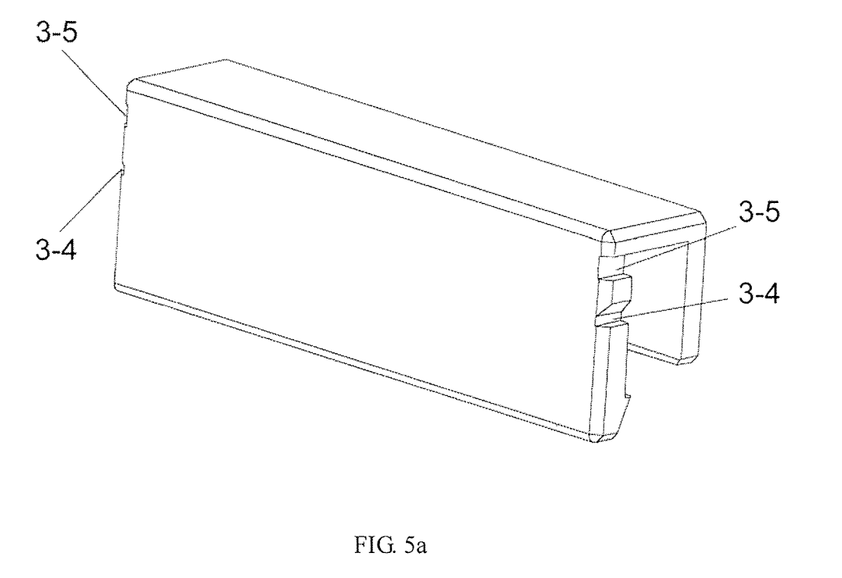
FIGS. 5a and 5b are 3D schematic diagrams of the structure of the building cover of the present invention. Wherein, Figure a is the 3D structural schematic diagram of the building cover and Figure b is its 3D section view.
Figure 5B:
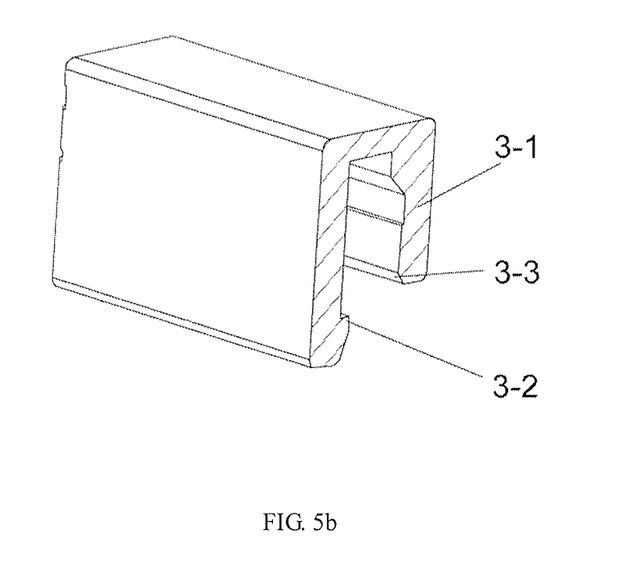

The building cover (3) is arranged with a building body (3-1), a chamfer angle (3-3), a starting card slot (3-4), a ending card slot (3-5), and a buckle (3-2).

Figure 1:
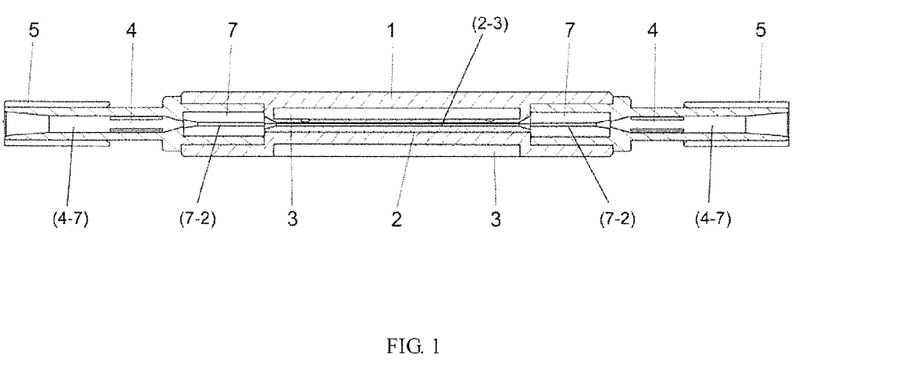
FIG. 1 is a 2D structural schematic diagram of the cold joint terminal for optical fiber according to example 1 of the present invention.
Figure 2A:
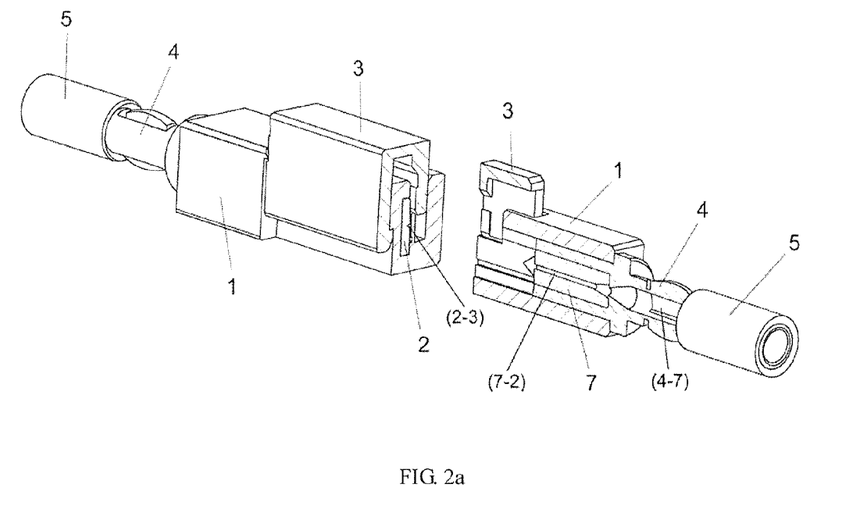
FIG. 2a is the 3D section view of the starting state and FIG. 2b is the 3D section view of the ending state.
Figure 2B:
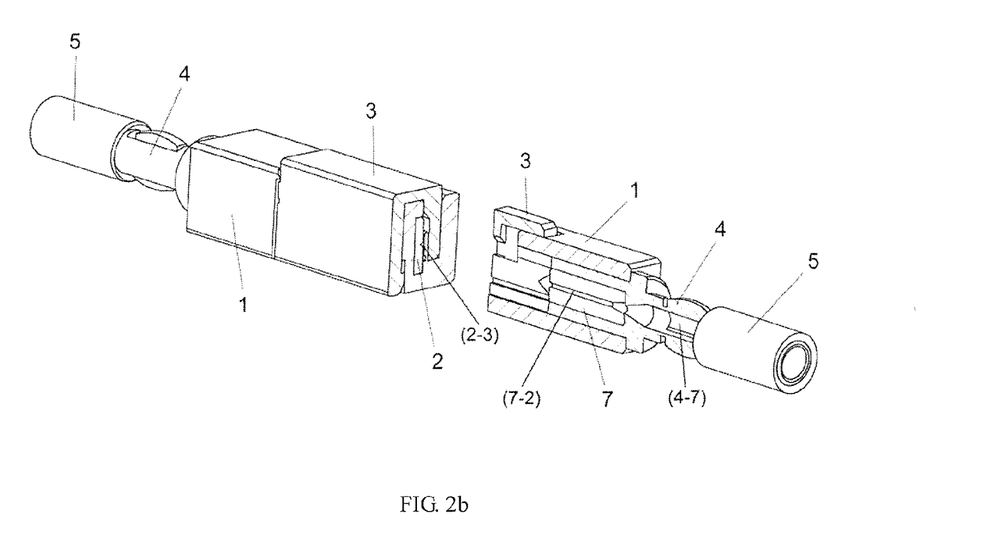
Figure 3A:
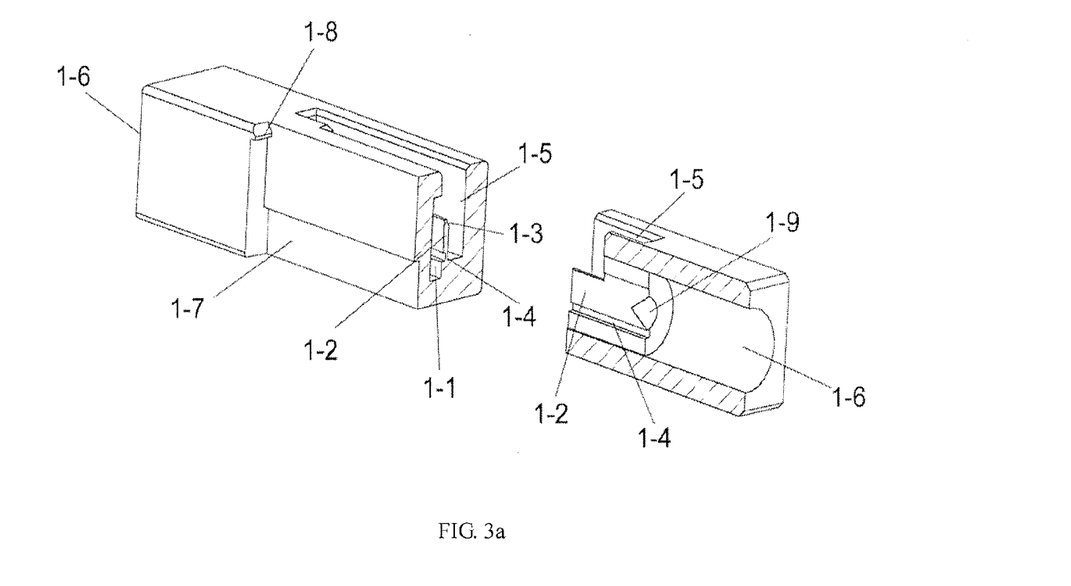
FIG. 3a is the 3D section view and FIG. 3b is the 3D outside view.
Figure 3B:
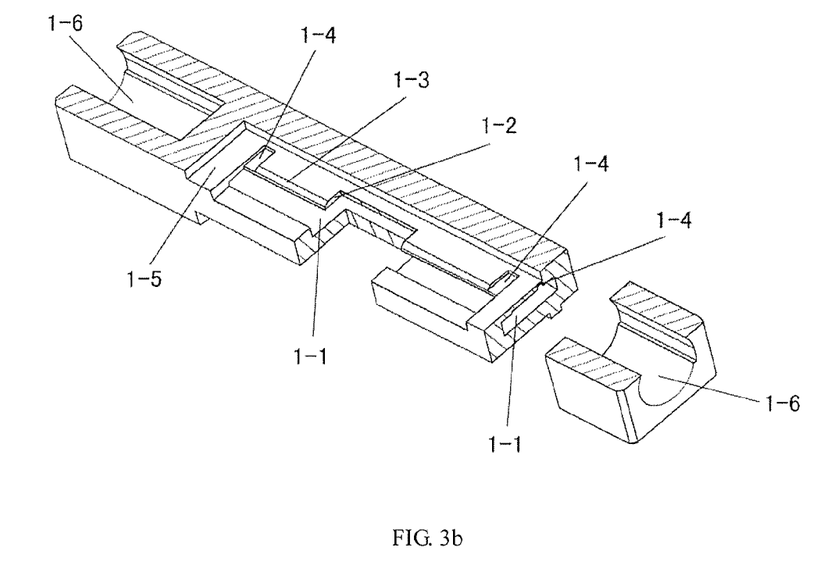
Figure 4:
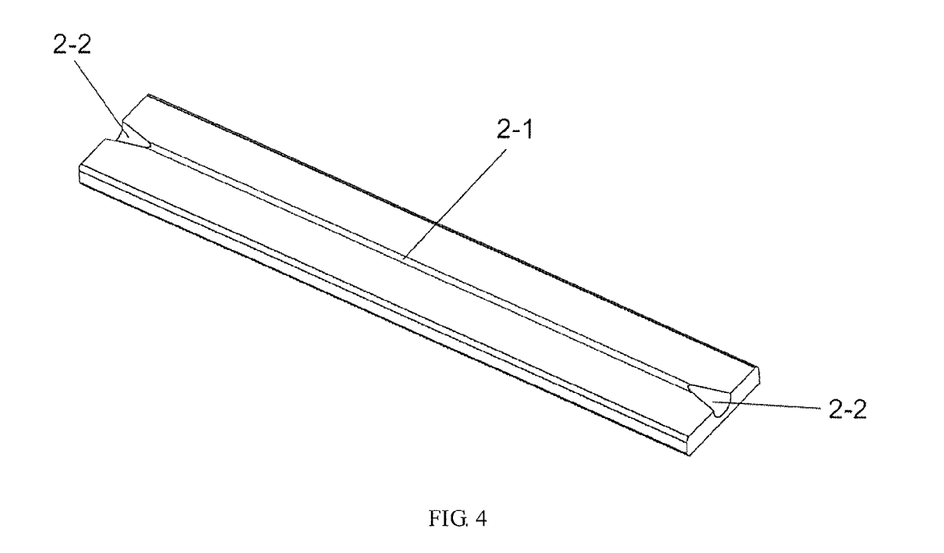
FIG. 4 is a 3D schematic diagram of the structure of the V-groove metal block of the present invention.

The V-groove metal block (2) and the floating block (1-2) are arranged with a V-groove (2-1) on the opposite surfaces. The optical fiber through hole (2-3) is formed between the V-slot (2-1) and the floating block (1-2); and the V-groove (2-1) of the V-groove metal block (2) is arranged with a guide surface (2-2) on both ends.

The floating block (1-2) is connected with the box-type case (1) by the floating bar (1-4). The floating block (1-2) is arranged with the guide slope (1-3) and the guide fiber surface (1-9). The guide slope (1-3) matches with the chamfer angle (3-3) of the building body. During the implementation, the building body (3-1) pushes the floating block through the guide slope (1-3) and thus pressing the two butted optical fibers tightly; the guide fiber face (1-9) and the guide face (2-2) of V-shaped metal block (2) form a complete optical fiber guide surface. The guide block (7) is arranged with the small positioning taper hole (7-1) and the optical fiber hole (7-2). The big positioning taper hole (4-3) and the small positioning taper hole (7-1) are both in a conical surface. The ejector sleeve (5) is arranged with the lead-in conical surface (5-1).

For the optical fiber cold joint terminal of this invention, the described optical fiber through hole (2-3) formed between the V-slot (2-1) and the floating block (1-2), optical fiber hole (7-2) of guide block in container (4-2) of the two caudal peduncles (4), and threading hole (6-1) of wire jacket (6) of caudal peduncle (4) compaction container (4-7) are all on the same axis.

Figure 6A:
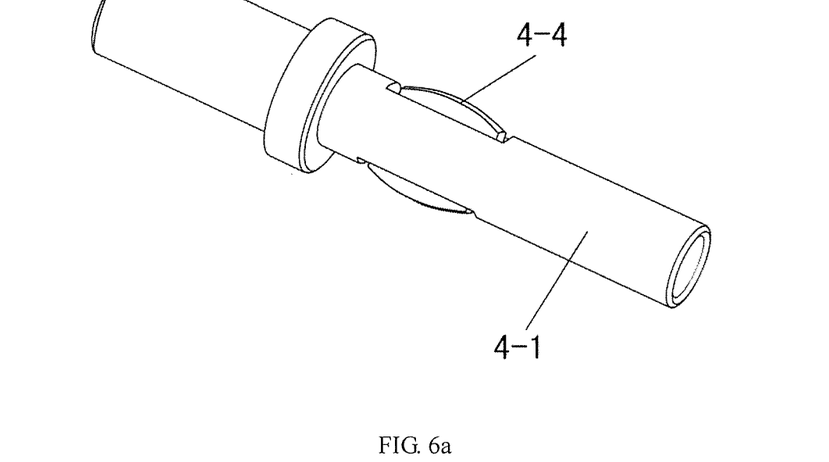
FIG. 6a is the 3D structural schematic diagram of the caudal peduncle and FIG. 6b is its 3D section view.
Figure 6B:
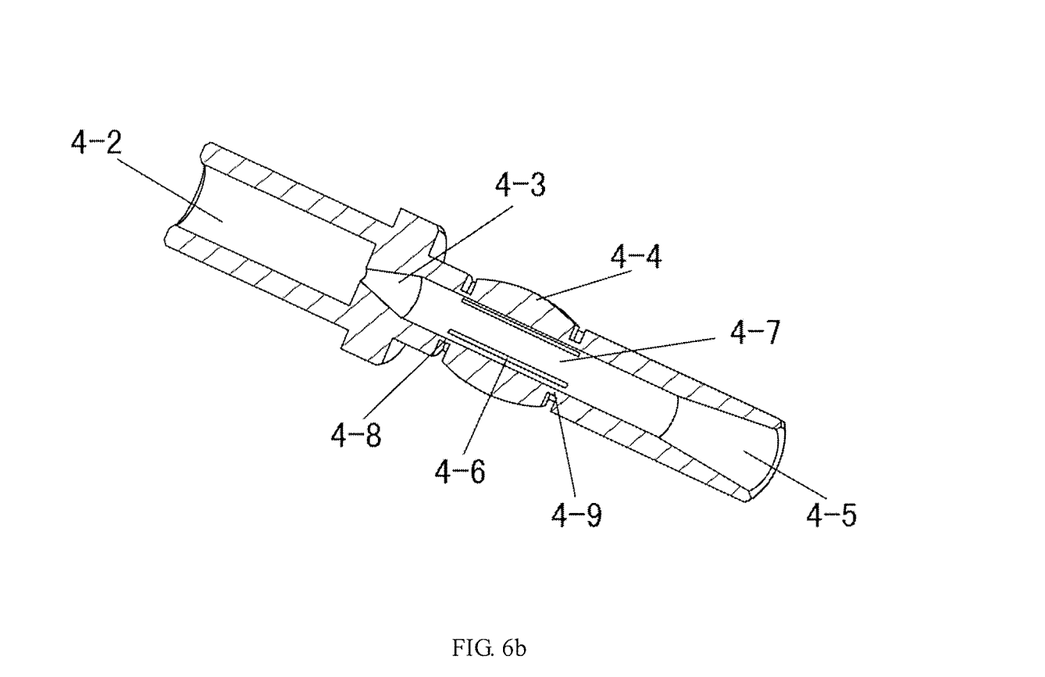
Figure 7:
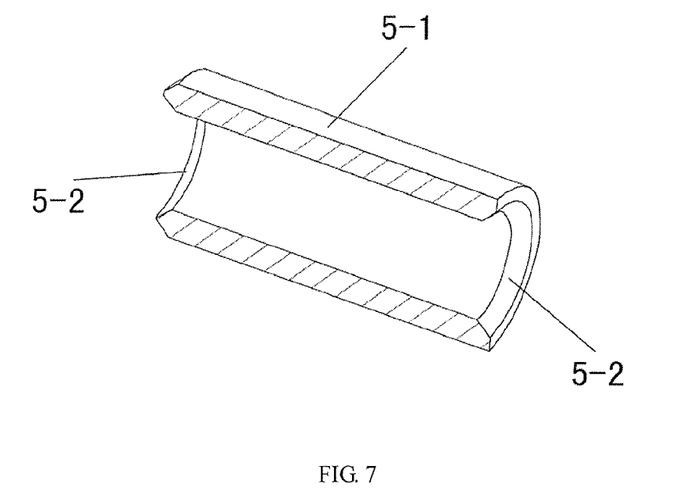
FIG. 7 is a 3D structure section view of the ejector sleeve of the present invention.
Figure 8:
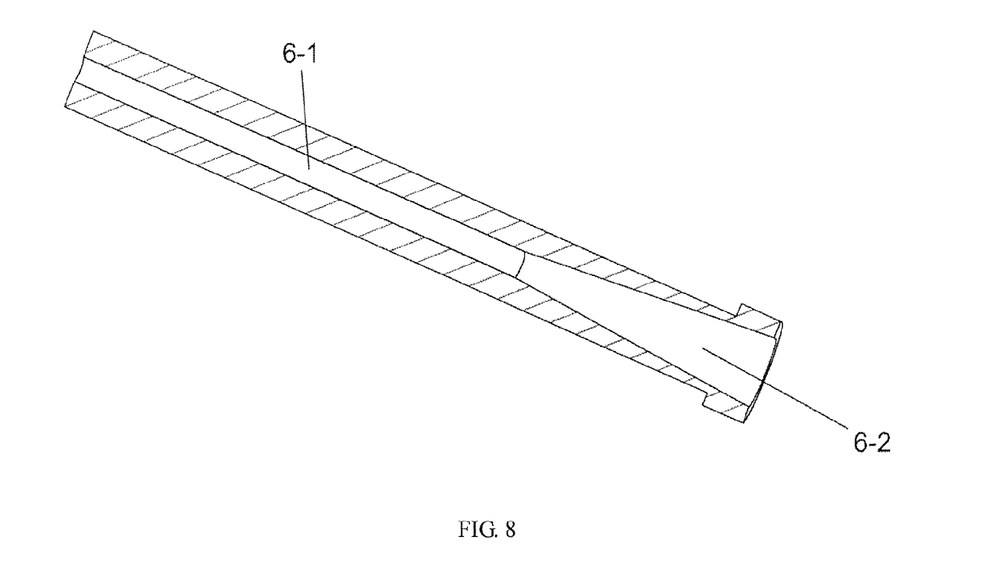
FIG. 8 is a 3D structure section view of the wire jacket of the present invention.
Figure 9:
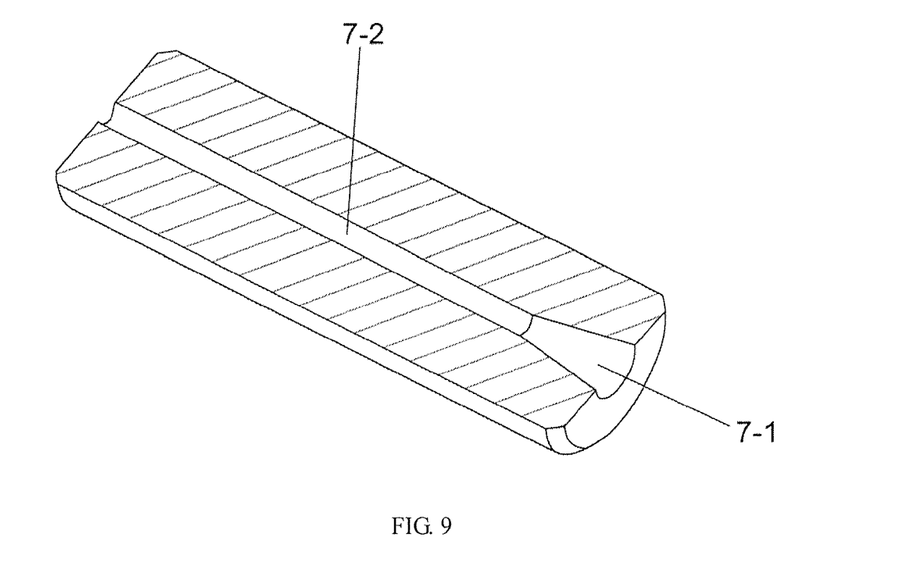
FIG. 9 is a 3D structure section view of the guide block of the present invention.
Figure 10:
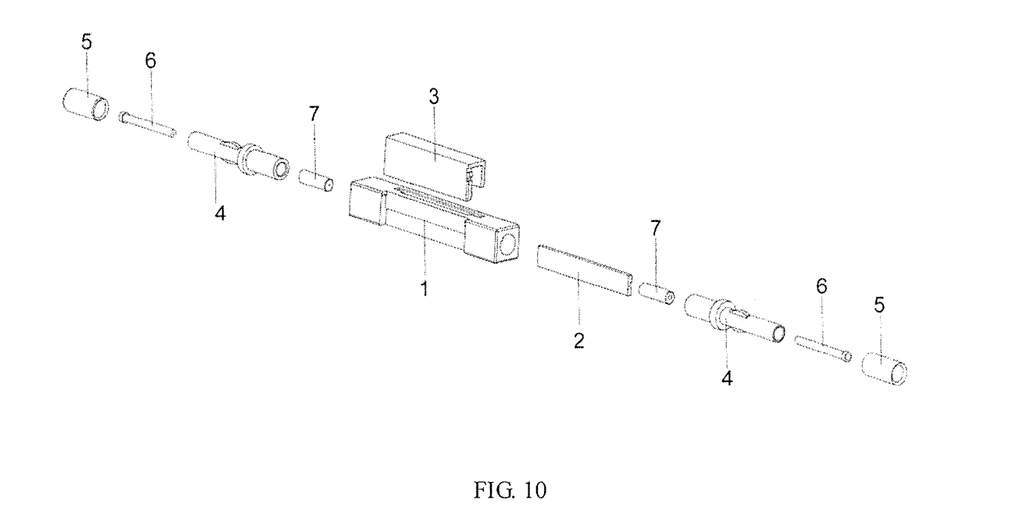
FIG. 10 is a 3D exploded view of the cold joint terminal for optical fiber according to example 2 of the present invention.

For the cold joint terminal for optical fiber of the present invention, a wire jacket (6) can be arranged in the caudal peduncle (4). Through the compression performed by the hanging block in the caudal peduncle, the wire jacket contracts to compress the minor sized optical fiber sheath.

The method for using the joint terminal of the present invention is as follows:

1. One optical fiber to be connected should be stuffed according to the fixed length and the pre-defined specifications.

2. Determine whether or not the wire jacket placed in the insertion end of the cold terminals in advance should be taken out according to the thickness of the optical fiber sheath (coating).

3. Directly insert the cut optical fiber into the end.

4. Push the ejector sleeve of the insertion end upwards and compress the optical fiber sheath.

5. The other optical fiber to be connected should be stuffed according to the fixed length and the pre-defined specifications.

6. Determine whether or not the wire jacket placed in the insertion end of the cold connectors in advance should be taken out according to the thickness of the optical fiber sheath (coating).

7. Directly insert the cut optical fibers until the end faces of the two optical fibers hug closely.

8. Push the ejector sleeve of the insertion end upwards and compress the optical fiber sheath.

9. Compress the building cover and compress the ends of the two optical fibers in the metal V-groove through the floating block to complete the connection work.

The invention claimed is:

1. A cold joint terminal for optical fiber comprises a box-shaped casing (1), a fixing device for fixing an optical fiber scarfskin after the optical fiber is inserted in place, and a compressing device for compressing laminate end faces of the optical fiber into a V-groove; wherein the box-shaped casing (1) has connection chambers (1-6) arranged on two sides of the box-shaped casing (1), and the center of the box-shaped casing (1) is arranged with a floating block (1-2) having a caulking groove (1-1) and a building slot (1-5) on each side respectively; and wherein the fixing device includes two caudal peduncles (4), two ejector sleeves (5), and two guide blocks (7), each of the guide blocks (7) is arranged in the box-shaped casing (1) and the ejector sleeve (5) is arranged outside the box-shaped casing (1), one side of the caudal peduncle (4) is arranged in the box-shaped casing (1)

and the other side of the caudal peduncle (4) is arranged outside the box-shaped casing (1), each of the guide blocks (7) is equipped with a small positioning taper hole (7-1) and an optical fiber hole (7-2), the one side of the caudal peduncle (4) arranged in the box-shaped case (1) is pushed into the connection chambers (1-6) on the two sides of the box-shaped casing (1), each of the guide blocks (7) is pushed into a container (4-2) in the caudal peduncle (4), the caudal peduncle (4) is arranged with a big positioning taper hole (4-3) and a compressing chamber (4-7) inside, the big positioning taper hole (4-3) is of a conical surface, the caudal peduncle (4) is equipped with at least one hanging block (4-4) which is connected with the caudal peduncle (4) by both a bar to be broken (4-8) and a connecting bar (4-9), the ejector sleeve (5) is attached to the other side of the caudal peduncle (4) and can push down the hanging block (4-4) to compress the optical fiber scarfskin and clamp the optical fiber by rupturing a front end of a tendon to be broken (4-8), making the space in the caudal peduncle becomes smaller, and thus the optical fiber scarfskin threading the space is fixed; and wherein the compressing device includes a V-groove metal block (2) and a building cover (3), the V-groove metal block is embedded in the caulking groove (1-1) of the box-shaped casing (1), the optical fiber hole (2-3) is formed between the V-groove (2-1) and the floating block (1-2), one side of the building cover (3) is pushed into the caulking groove (1-5) in the box-shaped casing (1), the floating block (1-2) is pressed to compress a connector of the optical fiber in V-groove metal block (2) in the caulking groove (1-1), the other side of the building cover (3) is arranged outside the box-shaped casing (1), the floating block (1-2) and the box-shaped casing (1) are connected by a floating bar (1-4), the floating block (1-2) is also arranged with a guide slope (1-3), the body (3-1) of the building cover is arranged with a chamfer angle (3-3) matching with the guide slope (1-3), the building cover (3) pushes the floating block (1-2) through the guide slope (1-3), thus pressing the two butted optical fibers tightly, and the optical fiber holes (7-2) of the guide blocks (7) in the containers (4-2) of the two caudal peduncles (4) and the compression chambers (4-7) of the caudal peduncles (4) are on the same axis.

2. The cold joint terminal for optical fiber according to claim 1, wherein, the box-shaped casing (1) is arranged with a card slot (1-7) on the outside surface, the building cover (3) is equipped with a buckle (3-2), and the box-shaped casing (1) snaps in the card slot (1-7) and is jointed with the building cover (3) by the buckle (3-2); and wherein a positioning table (1-8) is arranged on both sides of the outside surface of the box-shaped casing (1) and it matches with a starting card slot (3-4) and an ending card slot (3-5) on the two sides of the building cover (3) to control the location of the building cover (3).

3. The cold joint terminal for optical fiber according to claim 2, wherein, the two sides of the V-groove (2-1) of the V-groove metal block (2) are arranged with guide faces (2-2).

4. The cold joint terminal for optical fiber according to claim 1, wherein, the big positioning taper hole (4-3) and the small positioning taper hole (7-1) are both of a conical surface.

5. The cold joint terminal for optical fiber according to claim 4, wherein, the ejector sleeve (5) is arranged with a lead-in taper surface (5-1).

6. The cold joint terminal for optical fiber according to claim 1, wherein, the ejector sleeve (5) is arranged with a lead-in taper surface (5-1).

7. The cold joint terminal for optical fiber according to claim 1, wherein, the caudal peduncle (4) is arranged with a wire jacket (6) for compressing the optical fiber scarfskin.

8. The cold joint terminal for optical fiber according to claim 1, wherein, the two sides of the V-groove (2-1) of the V-groove metal block (2) are arranged with guide faces (2-2).

* * * * *